Patented Mar. 6, 1951

2,543,830

UNITED STATES PATENT OFFICE 2,543,830

ELECTROMAGNETIC BRAKE DEVICE

Paul B. Burrus and Lowell A. Ditmer, Dayton, Ohio, assignors, by mesne assignments, to Standard Dayton Corporation Application October 17, 1945, Serial No. 622,754

10 Claims. (Cl. 188—171)

This invention relates to electromagnetic devices and more particularly to the mounting of electromagnets and other members.

When electromagnets are energized from a source of alternating current, the magnetic pull consists of pulsating forces, in that the flux reverses in response to the alternations in the alternating current. It can readily be seen that there will be a tendency for the electromagnets to chatter, resulting in undesirable noises.

An object of this invention is to provide means for dampening the vibrations generated in the electromagnets, to thereby reduce or eliminate the magnetic chatter.

Another object of this invention is to provide resilient mountings wherein the resilient material is pulled or stretched while assembling the parts and then released to swell into position in suitable recesses.

Other objects and advantages reside in the construction of parts, the combination thereof and the mode of operation, as will become more apparent from the following description.

Figure 1:
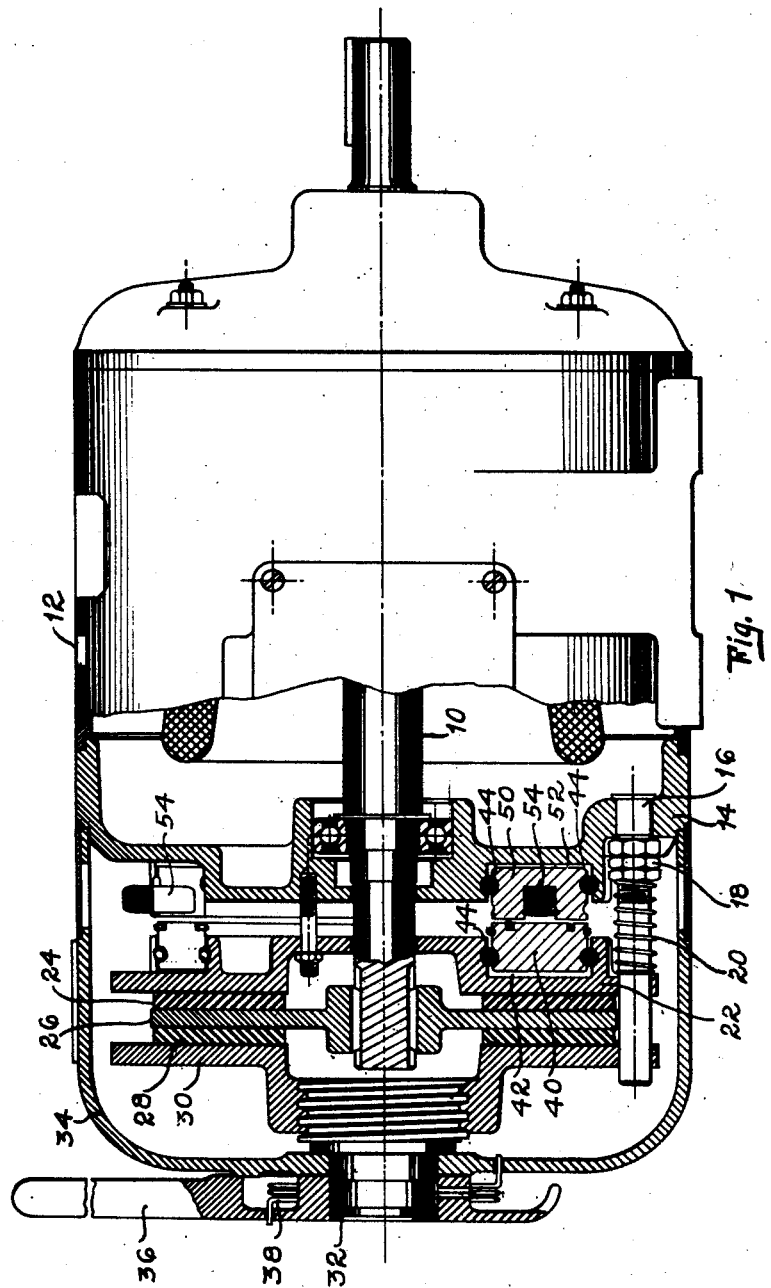

Referring to the drawings, Figure 1 is a side elevational view of an electric motor showing parts in section.

Figure 2:
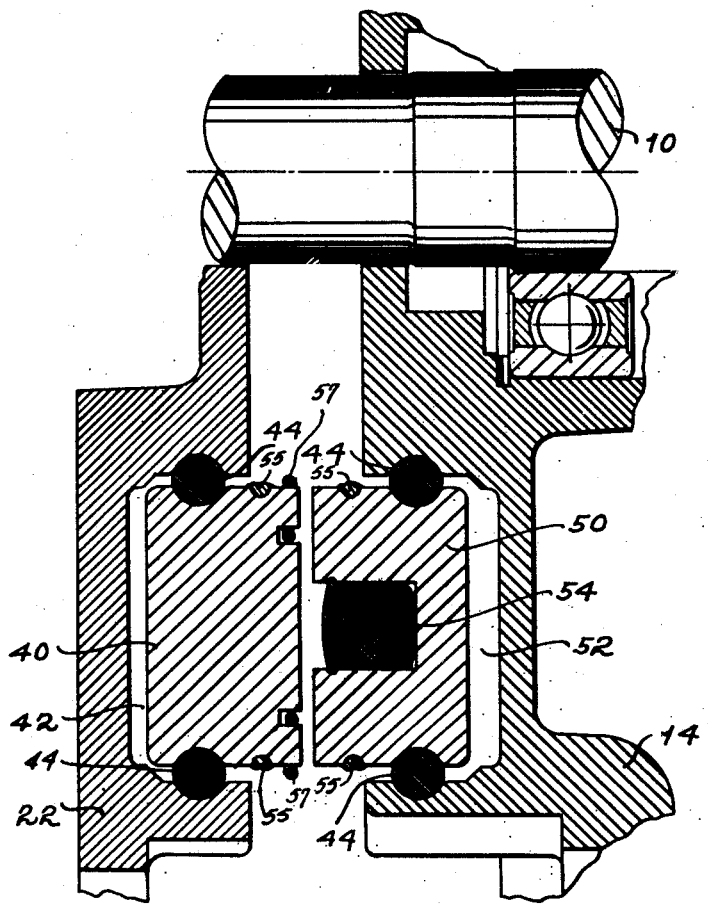

Figure 2 is a fragmentary, sectional view, drawn to a much larger scale than the scale used in Figure 1.

In the device disclosed in the drawings, the electromagnets have been shown used in association with a brake that is released by energizing electromagnets. The mounting of the electromagnets shown herein may be used irrespective of the use of electromagnets, whether the electromagnets be used in releasing brakes, in applying brakes, in applying a clutch, in releasing a clutch or for any other purpose wherein an electromagnet may be utilized.

The reference character 10 indicates an armature or rotor shaft of an electro-dynamic device 12, such as a motor or a generator. The end bell 14 supports a plurality of studs 16 locked in position by suitable nuts 18 and having mounted thereon helical springs 20 engaging a brake member 22 mounted for floating movement on the studs 16. Member 22 carries a brake lining 24 engaging a disc 26 splined to the end of the shaft 10, as clearly shown in Figure 1. A brake lining member 28 is fixedly attached to a brake member 30 located on the side of the disc 26 opposite member 22. Member 30 threadedly engages the stubshaft 32 projecting through the casing 34 enclosing the brake mechanism. Stubshaft 32 has fixedly attached thereto a handle 36 that may be used in releasing the brake manually. Whenever the manual force is released, a spring 38 restores the brake member 30 to the home position. Furthermore, the threaded stubshaft may be used in adjusting the brake to compensate for variations in the thicknesses of the brake linings.

When the electromagnets, which will be described more fully later, are not energized, the springs 20 apply the brake. The brake is released against the force of the springs 20 by a plurality of armatures or actuating members 40 mounted in cavities 42 in member 22.

A resilient band 44, which may be made from rubber or other resilient material such as neoprene and which is round in cross section, is mounted in recesses extending along the sides of the cavities 42 and similar recesses in the edges of the armatures 40. The resilient band 44 is preferably stretched to reduced the cross sectional area thereof when pulled through the recesses. When the resilient band is properly positioned, the ends are released permitting the band to contract and expand into the positions shown in the drawings. This results in ease in assembly and a dependable structure when assembled.

The armatures 40 cooperate with magnets 50 mounted in suitable recesses 52 in the end bell 14 and resiliently held in position by resilient bands 44 identical to those described in connection with the armatures 40. Magnetic coils 54 are used in energizing the electromagnets 50. These magnetic coils may be connected into the motor circuit, either in series or in parallel. The armatures 40 and the electromagnets 50 may be referred to as actuating members.

When the motor circuit is closed, the circuit through the coil 54 is also closed, thereby releasing the brake, in that the electromagnets 50 attract the armatures 40. Due to the cushion mounting of the electromagnets, vibrations of the magnets are dampened by the rubber mountings, so that these vibrations are not transmitted to any extent to the remaining structure of the motor, thereby eliminating the undesirable effects caused by alternating current electromagnets. The arrangement of the coil 54 linking the magnets per se, the shading rings 55 and 57 per se, et cetera, do not form a part of this invention and the mounting of the magnets is applicable to other electromagnets having different types of coils.

The use of resilient bands in mounting the electromagnets permits the use of ferro-magnetic material in members 14 and 22, in that the rubber bands function as air gaps as far as the magnetic circuit is concerned.

Furthermore, within the purview of this invention, other types of resilient mountings may be used instead of the rubber bands. The cross sectional area of the resilient member may be any suitable shape, depending entirely upon the structural details of the assembly.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. In an electromagnetic brake assembly for use in arresting the rotation of a rotary body, said assembly including a pair of relatively movable supports, a pair of actuating members one for each of the supports, one of said actuating members constituting an electromagnetic member, and resilient dampening means for resiliently mounting the actuating members upon their respective supports to dampen the vibrations of the electromagnets.

2. An electromagnetic brake assembly for use in arresting the rotation of a rotor including a pair of relatively movable supports, a pair of actuating members one for each of the supports, one of said actuating members constituting an electromagnetic member, resilient dampening means for resiliently mounting the actuating members upon their respective supports to dampen the vibrations thereof, and coil means linking the electromagnetic member associated with one of the supports.

3. An electromagnetic brake assembly for use in arresting the rotation of a rotor including a pair of relatively movable supports, a plurality of actuating members, at least one for each of the supports, some of the actuating members constituting electromagnets, resilient dampening means for resiliently mounting the actuating members upon their respective supports to dampen the vibrations thereof, and coil means linking the electromagnets associated with one of the supports.

4. In an electrodynamic brake device provided with a shaft supporting a rotor, a pair of non-rotatably mounted clutching members, a disc mounted for rotation with the rotor shaft positioned between the clutching members, electromagnetic means for controlling the movement of the clutching members in one direction, resilient means for controlling the movement of the clutching members in the opposite direction, one of said clutching members being provided with recesses, said brake device being characterized by means having recesses registering with the first mentioned recesses, electromagnets mounted in some of the recesses and resilient means disposed between the electromagnets and the walls of the recesses to provide resilient supports for the electromagnets to dampen the vibration thereof.

5. In an electrodynamic brake device provided with a shaft supporting a rotor, a pair of nonrotatably mounted clutching members, a disc mounted for rotation with the rotor shaft positioned between the clutching members, a support having a pair of internally disposed walls provided with recesses therein, an electromagnet mounted between the walls, said electromagnet having marginal recesses, said electrodynamic brake being characterized by resilient dampening means mounted in the recesses in the walls, said resilient dampening means being disposed between the electromagnet and the walls for dampening the vibration of the electromagnet.

6. In an electrodynamic brake device provided with a shaft supporting a rotor, a pair of nonrotatably mounted clutching members, a disc mounted for rotation with the rotor shaft positioned between the clutching members, a support having a pair of internally disposed walls, said walls having grooves, an electromagnet mounted between the walls, said brake device being characterized by resilient dampening means mounted in the grooves and located between the walls and the electromagnet to dampen the vibrations of the electromagnet.

7. In an electrodynamic brake device provided with a shaft supporting a rotor, a pair of nonrotatably mounted clutching members, a disc mounted for rotation with the rotor shaft positioned between the clutching members, a support having a pair of internally disposed walls, said brake device being characterized by an electromagnet mounted between the walls, said electromagnet having grooves in the sides thereof, and resilient dampening means mounted in the grooves and located between the support and the electromagnet to dampen the vibrations of the electromagnet.

8. In an electrodynamic brake device provided with a shaft supporting a rotor, a pair of nonrotatably mounted clutching members, a disc mounted for rotation with the rotor shaft positioned between the clutching members, a pair of relatively movable supports, a pair of actuating members, one for each of the supports, one of said actuating members constituting an electromagnetic member, said brake device being characterized by resilient dampening means for resiliently mounting the actuating members upon their respective supports to dampen the vibrations of the electromagnets.

9. In an electrodynamic brake device provided with a shaft supporting a rotor, a pair of nonrotatably mounted clutching members, a disc mounted for rotation with the rotor shaft positioned between the clutching members, a pair of relatively movable supports, a pair of actuating members one for each of the supports, said brake device being characterized by resilient dampening means for resiliently mounting the actuating members upon their respective supports to dampen the vibrations thereof, and coil means linking the electromagnet associated with one of the supports.

10. In an electrodynamic brake device provided with a shaft supporting a rotor, a pair of nonrotatably mounted clutching members, a disc mounted for rotation with the rotor shaft positioned between the clutching members, a pair of relatively movable supports, a plurality of actuating members, at least one for each of the supports, some of the actuating members constituting electromagnets, said brake device being characterized by resilient dampening means for resiliently mounting the actuating members upon their respective supports to dampen the vibrations thereof, coil means linking the electromagnets associated with one of the supports, and a common coil for linking the electromagnets.

PAUL B. BURRUS.
LOWELL A. DITMER.

REFERENCES CITED

The following references are of record in the file of this patent:

UNITED STATES PATENTS

| Number | Name | Date |
|---|---|---|
| 1,162,370 | Keefer | Nov. 30, 1915 |
| 1,172,917 | Thomas | Feb. 22, 1916 |
| 1,909,918 | Tanner | May 16, 1933 |
| 2,009,121 | Price | July 23, 1935 |
| 2,019,000 | Ponte | Oct. 29, 1935 |
| 2,116,522 | Kunze | May 10, 1938 |
| 2,148,796 | Barbieri | Feb. 28, 1939 |
| 2,160,153 | Kelley | May 30, 1939 |
| 2,172,460 | Warrick | Sept. 12, 1939 |
| 2,190,685 | Slater | Feb. 20, 1940 |